(12) United States Patent
Hirano

(10) Patent No.: US 10,571,262 B2
(45) Date of Patent: Feb. 25, 2020

(54) METHOD FOR CONTROLLING SURFACE TEXTURE MEASURING APPARATUS

(71) Applicant: Mitutoyo Corporation, Kawasaki, Kanagawa (JP)

(72) Inventor: Kotaro Hirano, Kure (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/119,342

(22) Filed: Aug. 31, 2018

(65) Prior Publication Data

US 2019/0072382 A1    Mar. 7, 2019

(30) Foreign Application Priority Data

Sep. 5, 2017  (JP) .................................. 2017-170153

(51) Int. Cl.
*G01B 11/30* (2006.01)
*G01B 11/00* (2006.01)
*G01B 11/24* (2006.01)

(52) U.S. Cl.
CPC .......... *G01B 11/303* (2013.01); *G01B 11/005* (2013.01); *G01B 11/007* (2013.01); *G01B 11/24* (2013.01); *G01B 2210/50* (2013.01)

(58) Field of Classification Search
CPC ... G01B 11/303; G01B 11/005; G01B 11/007; G01B 11/24; G01B 2210/50
USPC ......................................... 356/600–640, 448
See application file for complete search history.

(56) References Cited

U.S. PATENT DOCUMENTS

| | | | | |
|---|---|---|---|---|
| 2004/0107073 A1* | 6/2004 | Sakurada | ............... | G01B 5/012 702/167 |
| 2008/0294369 A1* | 11/2008 | Kojima | .................. | G01B 5/201 702/168 |
| 2009/0299692 A1* | 12/2009 | Yoshizumi | ............. | G01B 5/008 702/168 |
| 2011/0000277 A1* | 1/2011 | MacManus | .......... | G01B 21/042 73/1.79 |
| 2011/0083497 A1* | 4/2011 | Matsumiya | ............ | G01B 5/008 73/105 |

FOREIGN PATENT DOCUMENTS

JP    4041372    1/2008
JP    4359485    11/2009

* cited by examiner

*Primary Examiner* — Isiaka O Akanbi
(74) *Attorney, Agent, or Firm* — Rankin, Hill & Clark LLP

(57) ABSTRACT

There is provided a method for controlling a surface texture measuring apparatus equipped with a probe that cannot detect an edge portion so as to automatically perform edge detection and automatically set a workpiece coordinate system. Accordingly, it is possible to reduce discrepancies by individual operators when setting a coordinate system, and improve the workability of coordinate system setting. A surface to be measured is scanned with a probe along a preset preliminary measurement path. When a detection error which causes when the surface to be measured is out of the tracking range of the probe occurs, a measurement value immediately before the detection error has occurred is temporarily registered as a temporary edge point. When the detection error continues during the subsequent scanning for a predetermined distance along the preliminary measurement path, the temporarily registered temporary edge point is set to an edge point.

5 Claims, 18 Drawing Sheets

METHOD FOR CONTROLLING SURFACE TEXTURE MEASURING APPARATUS

INCORPORATION BY REFERENCE

This application is based upon and claims the benefit of priority from Japanese patent application No. 2017-170153, filed on Sep. 5, 2017, the disclosure of which are incorporated herein in its entirety by reference.

BACKGROUND OF THE INVENTION

1. Field of the Invention

The present invention relates to a method for controlling a surface texture measuring apparatus. The present invention relates to a method for controlling a surface texture measuring apparatus that, for example, measures the shape, surface roughness, and the like of a surface of a workpiece (object to be measured) by scanning the surface of the object to be measured. More specifically, the present invention relates to an edge detecting function of a surface texture measuring apparatus, and further relates to a workpiece identifying function (workpiece-coordinate-system setting function) based on the edge detection function.

2. Description of Related Art

As sensors for detecting a workpiece, there are contact probes for example. These sensors each approach the surface of an object to be measured along the normal-line direction of the workpiece, and detect a position (coordinates) of the surface of the workpiece on the normal line. Such a sensor (probe) that detects a workpiece as "points" is referred to as a point sensor in this specification. By scanning a surface of a workpiece with a point sensor, the shape, roughness, waviness, and the like of the surface of the workpiece on the scanning line are acquired in detail.

To measure a workpiece by a shape measuring apparatus, a sensor needs to be set at a measurement start point. A sensor can be set at a measurement start point visually and manually by an operator, but which causes a problem that the measurement start point varies depending on individual operators and every measurement. For this reason, some methods are used to position a sensor at a measurement start point.

As a first method, a shape measuring apparatus is equipped with an image sensor. In this case, by performing image measurement of a workpiece, an image of the workpiece is preliminarily acquired by the image sensor. The shape of the workpiece is recognized by an image recognition technique, and a workpiece coordinate system is automatically set. Then, a measurement start point is automatically recognized in the image of the workpiece, and a point sensor is moved to the measurement start point to start measurement. Thus, the measurement as intended by the operator is performed, and a desired measurement result is acquired.

However, it requires considerable cost to equip a shape measuring apparatus with an image sensor and an image recognition function.

As a second method, a shape measuring apparatus preliminarily measures a workpiece with a point sensor, and automatically sets a workpiece coordinate system (for example, JP 4041372 B and JP 4359485 B). For example, in FIG. 1, it is assumed that the surface texture (the roughness and waviness of the surface) of a workpiece W is desired to be measured by scanning measurement. It is further assumed that a measurement line ML to be scanned in the scanning measurement is preset in a measurement part program. In this case, in the measurement part program, a workpiece coordinate system is defined based on, for example, the design CAD data of the workpiece, and the measurement line ML is designated in the workpiece coordinate system.

In FIG. 1, a front-side first edge Ed1 is an Xw axis of the workpiece coordinate system, and a second edge Ed2 intersecting with the first edge Ed1 (Xw axis) is a Yw axis of the workpiece coordinate system. The intersection point of the Xw axis and the Yw axis is an origin point Ow of the workpiece coordinate system. The measurement start point, the measurement line ML (or the travelling direction of the point sensor), the measurement end point, and the like are set in the workpiece coordinate system. (FIG. 1 shows that the edges are slightly shifted from the coordinate axes for the sake of expression.)

To perform actual measurement, an operator may set a workpiece coordinate system visually and manually every time a workpiece W is placed on the shape measuring apparatus, but the shape measuring apparatus automatically recognizes the edges of the workpiece and automatically sets the workpiece coordinate system. For example, in JP 4041372 B and JP 4359485 B, a point sensor scans several times in the directions intersecting with the edges as exemplified in FIG. 2 in order to preliminarily detect the edge portions.

In the example in FIG. 2, the point sensor scans in the direction intersecting with the front-side first edge Ed1 four times (PL11 to PL14), and further scans in the direction intersecting with the second edge four times (PL15 to PL18). During the scanning along the preliminary measurement lines PL11 to PL14, there are points at which the measurement values are changed suddenly. When it is assumed that these changing points are CP11 to CP14, a straight line SL1 is defined by a line connecting the changing points CP11 to CP14. Similarly, during the scanning along the preliminary measurement lines PL15 to PL18, there are points at which the measurement values are changed suddenly. When it is assumed that these changing points are CP15 to CP18, a straight line SL2 is defined by a line connecting the changing points CP15 to CP18.

By calculating the intersection point of the straight line SL1 and the straight line SL2, the origin point Ow of the workpiece coordinate system is acquired. Then, the straight line SL1 is the Xw axis of the workpiece coordinate system, and the straight line SL2 is the Yw axis of the workpiece coordinate system. The direction orthogonal to the Xw axis and the Yw axis is a Zw axis. (FIG. 2 shows that the edges are slightly shifted from the coordinate axes for the sake of expression.)

In this manner, the shape measuring apparatus automatically performs preliminary measurement of a workpiece and sets a workpiece coordinate system, and thus a portion to be measured designated by a measurement part program (for example, the measurement line ML) can be measured.

Note that, it is difficult for probes as disclosed in JP 4041372 B and JP 4359485 B to detect an edge. Shape analysis including a plurality of steps is performed to "detection values" (measurement values) to detect a characteristic portion such as an edge (JP 4041372 B and JP 4359485 B).

SUMMARY OF THE INVENTION

As point sensors, there are chromatic point sensors (CPS), for example. (A chromatic point sensor is sometimes referred to as a confocal microscope.) A CPS uses measurement light to adjust a focal point, and has resolution of extremely-high wavelength order. Furthermore, since a CPS is a contactless sensor, the measurement pressure is zero, and the rigidity of an object to be measured does not matter.

A CPS is a remarkable point sensor having many advantages, but has a problem that the measurement axis is only one and that the measurement range is extremely short. For example, when a CPS is used to detect an edge, the CPS exceeds its range at the moment when crossing over the edge, and a detection error occurs. Thus, a shape measuring apparatus equipped with a CPS cannot automatically detect an edge of a workpiece and therefore cannot automatically set a workpiece coordinate system with a simple operation. An operator has no option but either to place a workpiece at the same position for each time using, for example, a jig, or to visually and manually set a workpiece coordinate system. However, either option takes much time and measurement results vary.

As well as a CPS, a contact or contactless probe having only one measurement axis and an extremely-short measurement range has a common problem that edge detection cannot be performed. In the case of contactless sensors, if a sensor has a sufficiently-long measurement range, there are various detection methods for an optical sensor, an electrostatic capacity sensor, a magnetic sensor, and the like. The respective detection methods have their characteristics, and some material or surface texture is not suitable for each method. Thus, the edge portion of a workpiece cannot be detected, and an error can occur.

A purpose of the present invention is to provide a method for controlling a surface texture measuring apparatus equipped with a probe that cannot detect an edge portion so as to automatically perform edge detection and automatically set a workpiece coordinate system.

Accordingly, it is possible to reduce discrepancies by individual operators when setting a coordinate system, and to improve the workability of the coordinate system setting.

A method for controlling a surface texture measuring apparatus according to an embodiment of the present invention is a method for controlling a surface texture measuring apparatus that scans a surface of an object to be measured with a contact or contactless probe and measures a shape of the surface of the object to be measured, the method including:

scanning the surface of the object to be measured along a preset preliminary measurement path with the probe;

temporarily registering, when a detection error of the probe occurs, a measurement value immediately before the detection error has occurred as a temporary edge point; and setting, when the detection error continuously occurs during the subsequent scanning along the preliminary measurement path for a predetermined distance, the temporarily-registered temporary edge point as an edge point.

In an embodiment of the present invention, it is preferable that the preliminary measurement path is set so as to extend, in a machine coordinate system, from a virtual surface to be measured of a virtually-set virtual object to be measured and to further extend straightly after crossing over a virtual edge.

A method for controlling a surface texture measuring apparatus according to an embodiment of the present invention is a method for controlling a surface texture measuring apparatus that scans a surface of an object to be measured with a contact or contactless probe and measures a shape of the surface of the object to be measured, the method including:

presetting a preliminary measurement path so as to extend from outside the object to be measured toward the object to be measured;

outputting a detection error during the probe scans along the preliminary measurement path outside the object to be measured;

acquiring a measurement value when the probe reaches an edge of the object to be measured; and setting, as an edge point, a point where a state in which the measurement value is not acquirable due to the detection error is changed to a state in which the measurement value is acquirable.

In an embodiment of the present invention, it is preferable that the probe is a chromatic point sensor.

DETAILED DESCRIPTION

Figure 1:
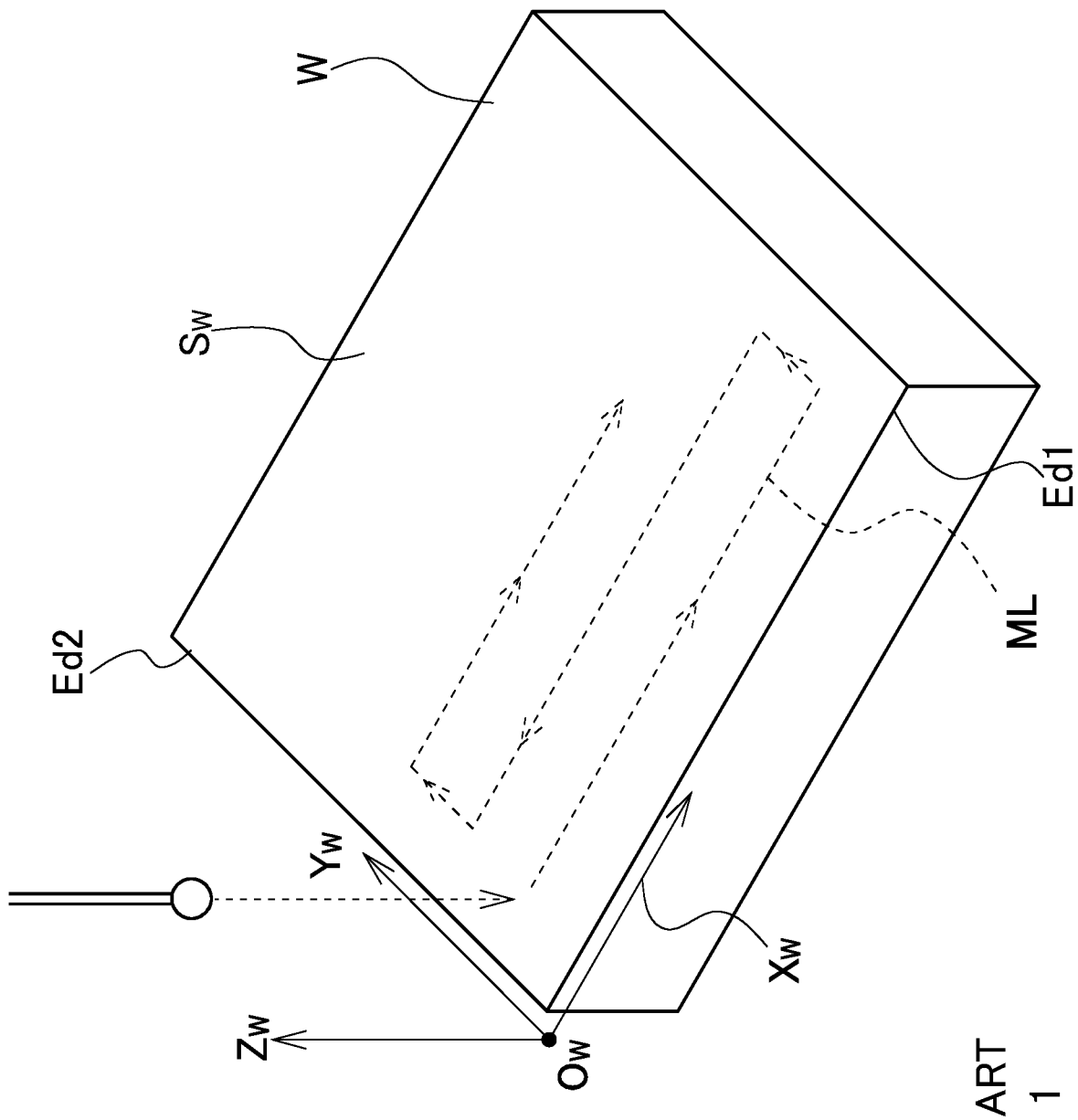
FIG. 1 is a diagram schematically showing that scanning measurement is performed to an object to be measured.
Figure 2:
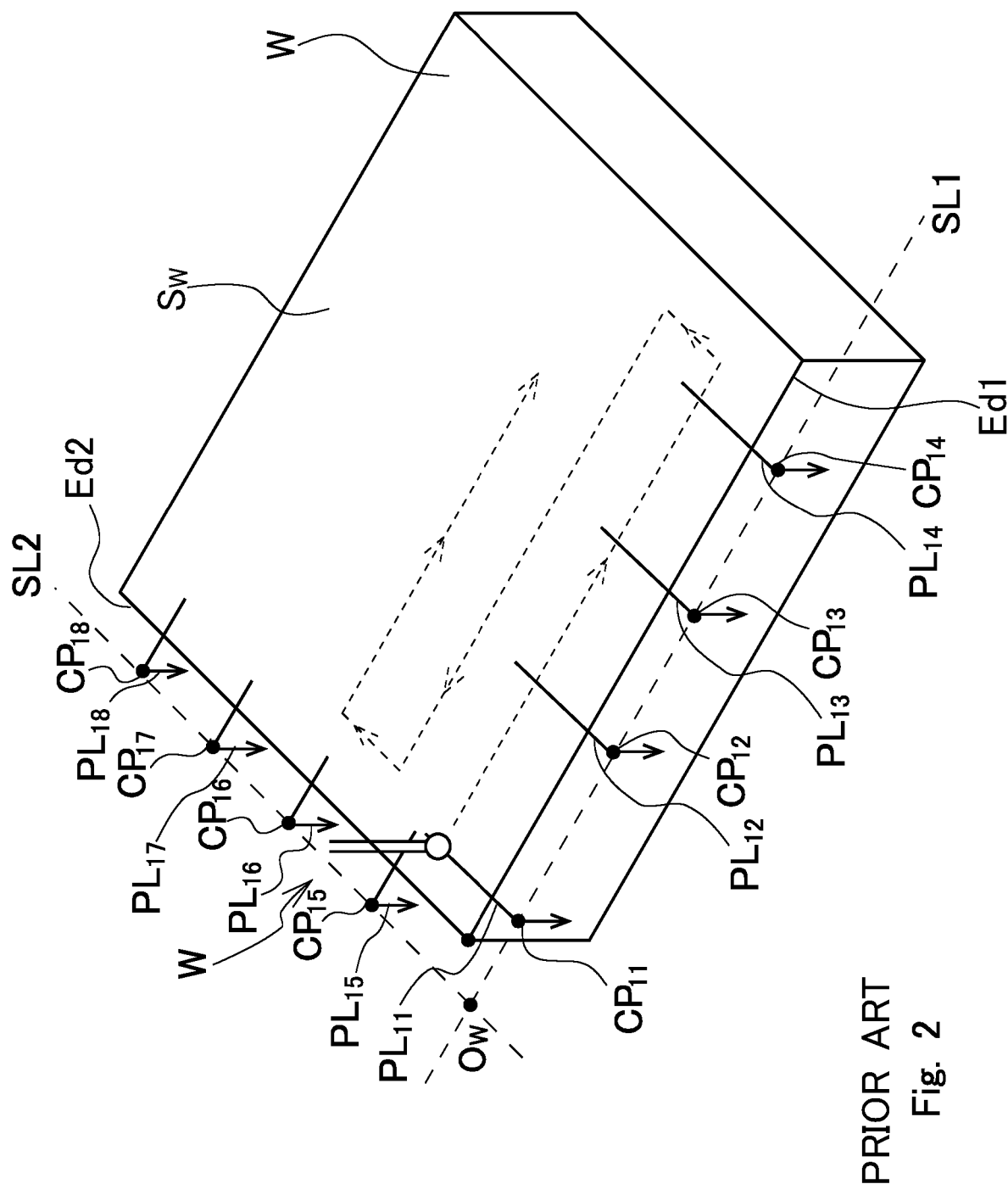
FIG. 2 is a diagram schematically showing that preliminary measurement is performed to an object to be measured.

An exemplary embodiment of the present invention is illustrated and described with reference to reference signs assigned to elements in the drawings.

First Exemplary Embodiment

Figure 3:
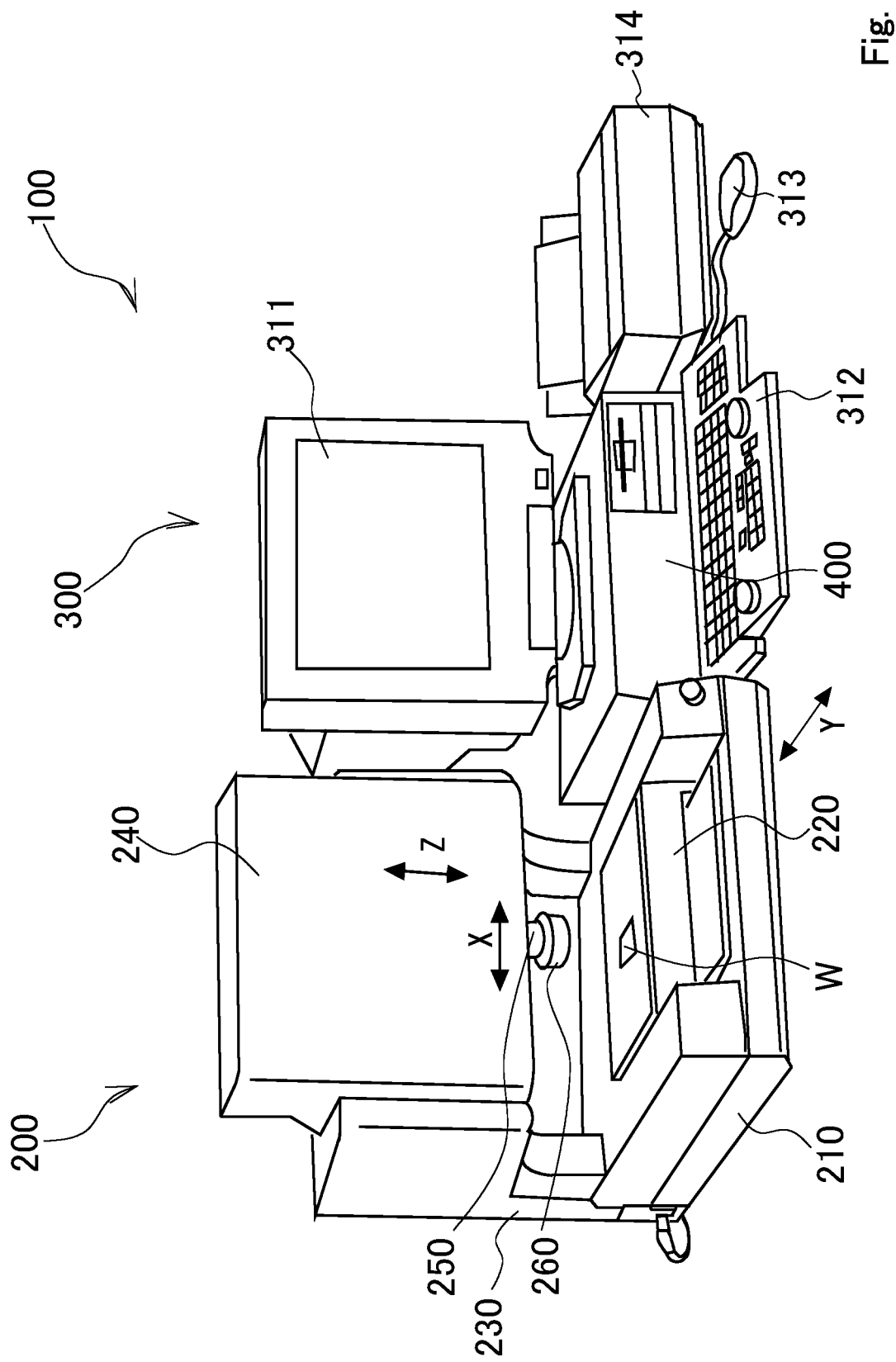
FIG. 3 is a diagram schematically showing a surface texture measuring apparatus.

FIG. 3 is a diagram showing a surface texture measuring apparatus 100 according to a first exemplary embodiment.

The surface texture measuring apparatus 100 includes a coordinate measuring machine 200 and a control computer unit 300. The control computer unit 300 controls the drive of the coordinate measuring machine 200 and performs necessary data processing.

The coordinate measuring machine 200 is roughly configured as follows.

On a console table 210, a moving table 220 on which a workpiece W as an object to be measured is placed is mounted. The moving table 220 is driven in the Y axis direction by a Y-axis driving mechanism (not illustrated). At the rear end of the console table 210, a frame 230 extending upward is fixed. An X-axis driving mechanism and a Z-axis driving mechanism, which are not illustrated, are disposed inside a cover 240 projecting from the upper part of the frame 230 toward the front face. The X-axis driving mechanism and the Z-axis driving mechanism support a chromatic point sensor (CPS) 260. The Z-axis driving mechanism includes a Z-axis column and a Z spindle 250 provided inside the Z-axis column so as to move upward and downward. The CPS 260 is provided at the lower part of the Z spindle 250 so as to face the moving table 220 from above.

The workpiece W as the object to be measured is placed on the moving table 220.

The X-axis driving mechanism and the Z-axis driving mechanism which are disposed inside the cover 240, and the Y-axis driving mechanism of the moving table 220 constitute a moving mechanism. A configuration of the moving mechanism is only required to three-dimensionally move the CPS 260 and the workpiece W relatively to each other, and is not limited to the above configuration. For example, a fixed table supports the CPS 260 so as to move three-dimensionally, or vice versa.

The CPS 260 irradiates an object to be measured with white light (measurement light), and adjusts the focal point highly accurately and quickly using the axial chromatic aberration of the reflected light. If an object to be detected is not on the optical axis, a CPS cannot detect the object, and this means the optical axis is the measurement axis line (detection axis line). The tracking range of the CPS 260 is about 6 mm (±3 mm) at the longest, and about 0.25 mm (±0.125 mm) at the shortest.

Figure 4:
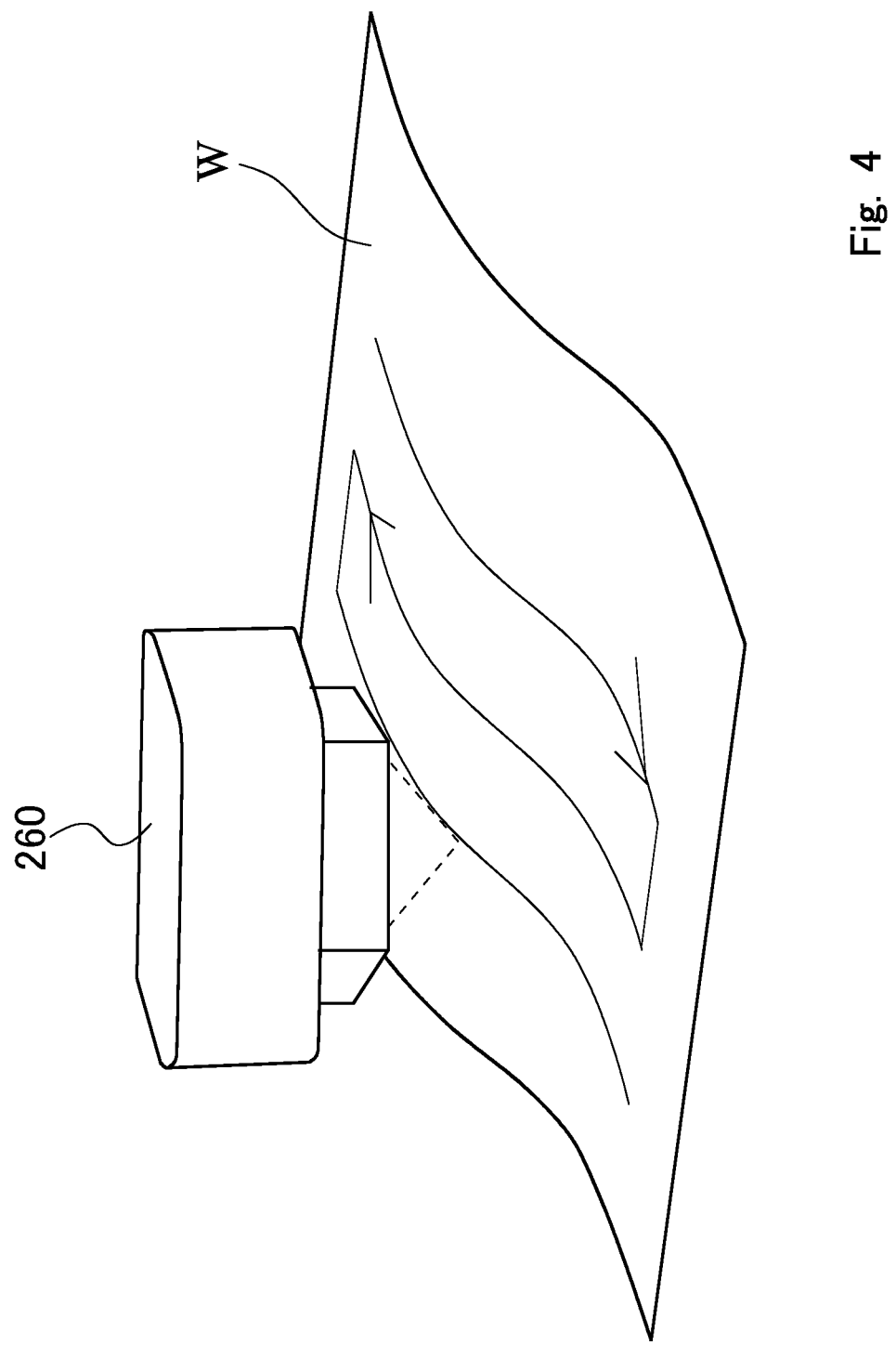
FIG. 4 is a diagram schematically showing that a surface of an object to be measured is scanned with a chromatic point sensor.

For example, the surface of a workpiece is scanned by the CPS 260 as shown in FIG. 4.

Figure 5:
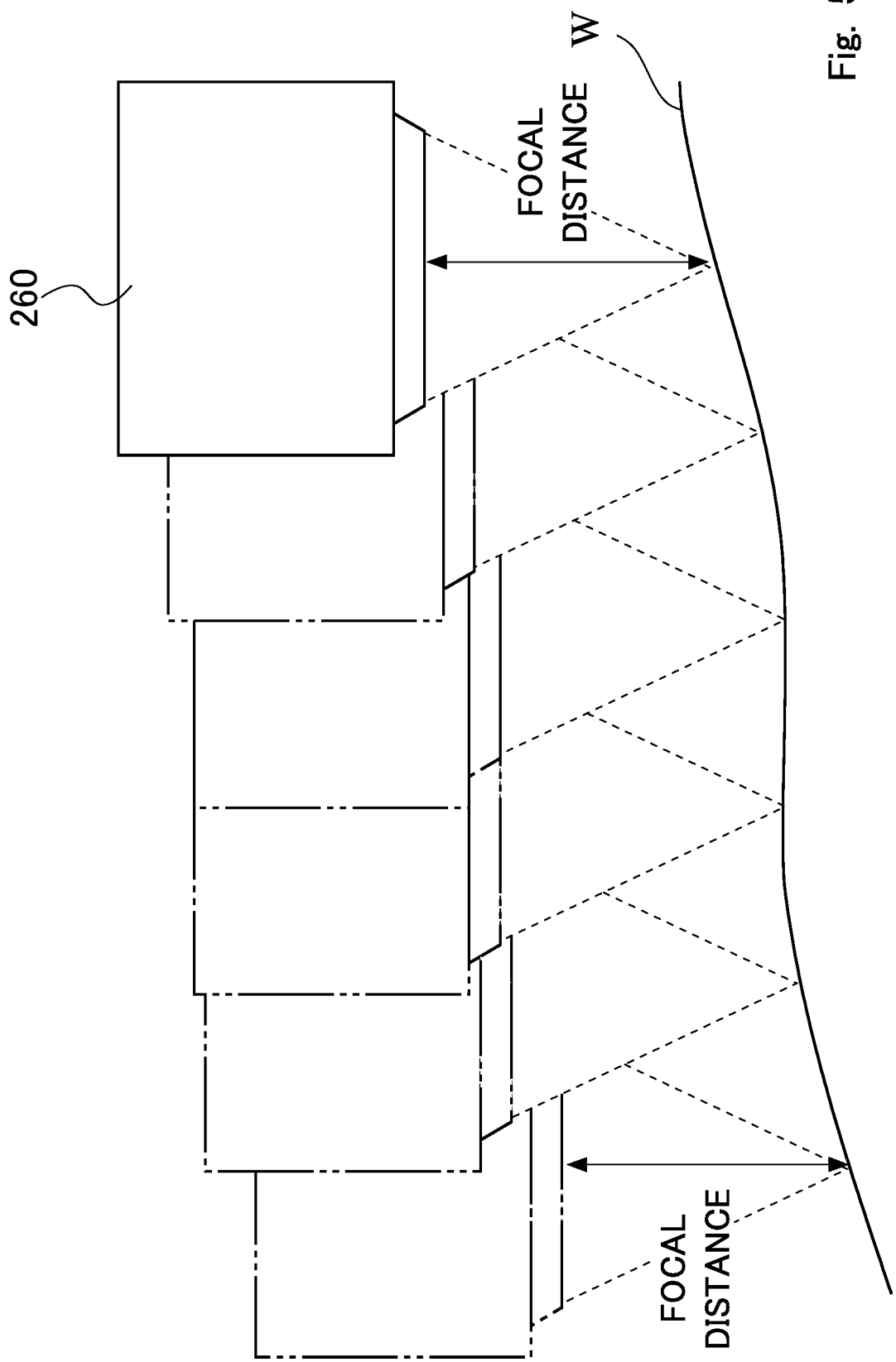
FIG. 5 is a diagram schematically showing that the surface of the object to be measured is scanned with the chromatic point sensor.

At this time, the height of the CPS 260 is adjusted by the moving mechanism (the Z-axis driving mechanism) to adjust the focal point. The change in the height positions of the CPS 260 at this time corresponds to the shape of the surface of the workpiece W (see FIG. 5).

The control computer unit 300 includes a host computer 400 and an input/output means. As the input/output means, a display 311, a keyboard 312, a mouse 313, and a printer 314 are provided. The display 311 may be a touch panel.

Figure 6:
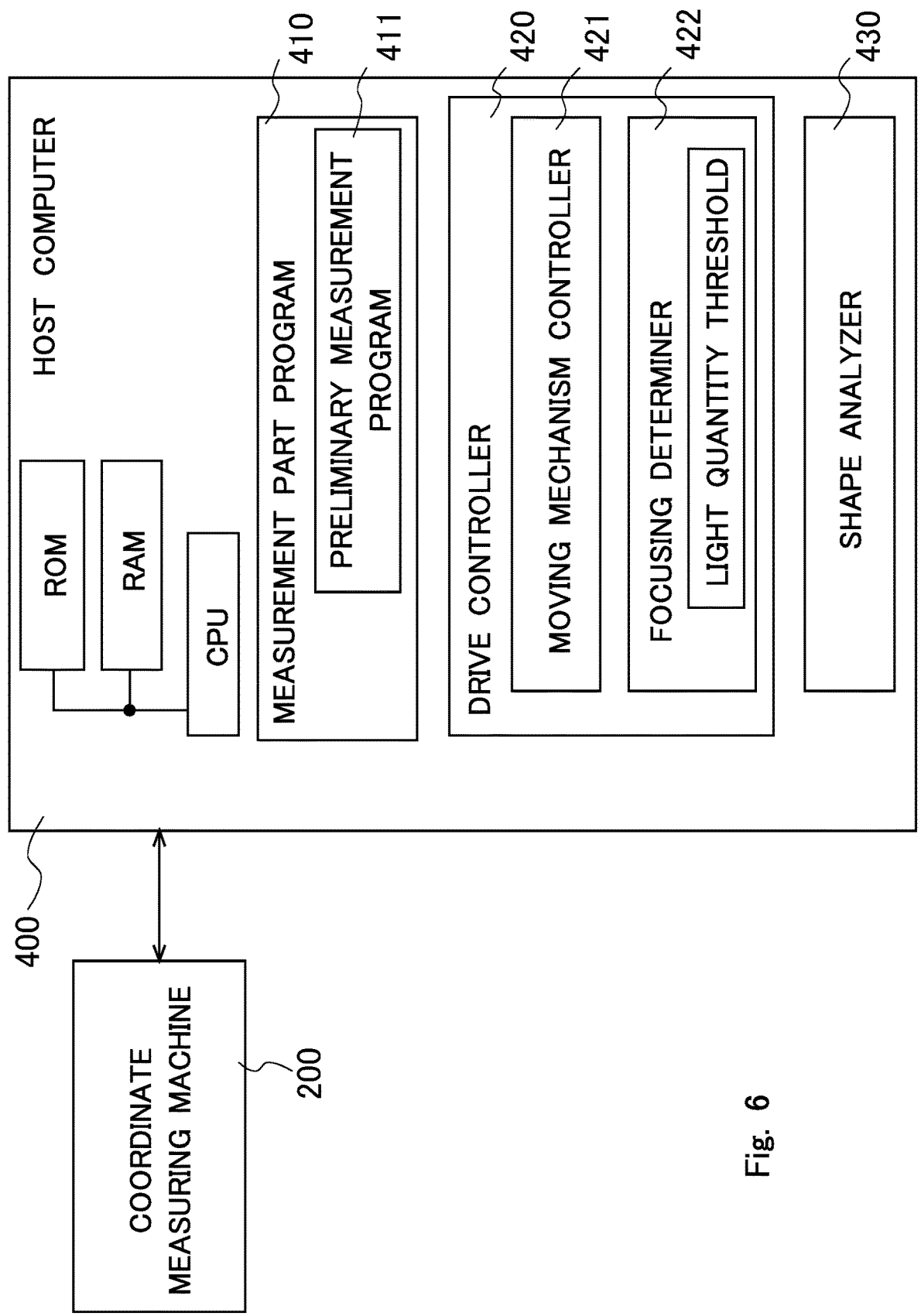
FIG. 6 is a functional block diagram of a host computer.
Figure 7:
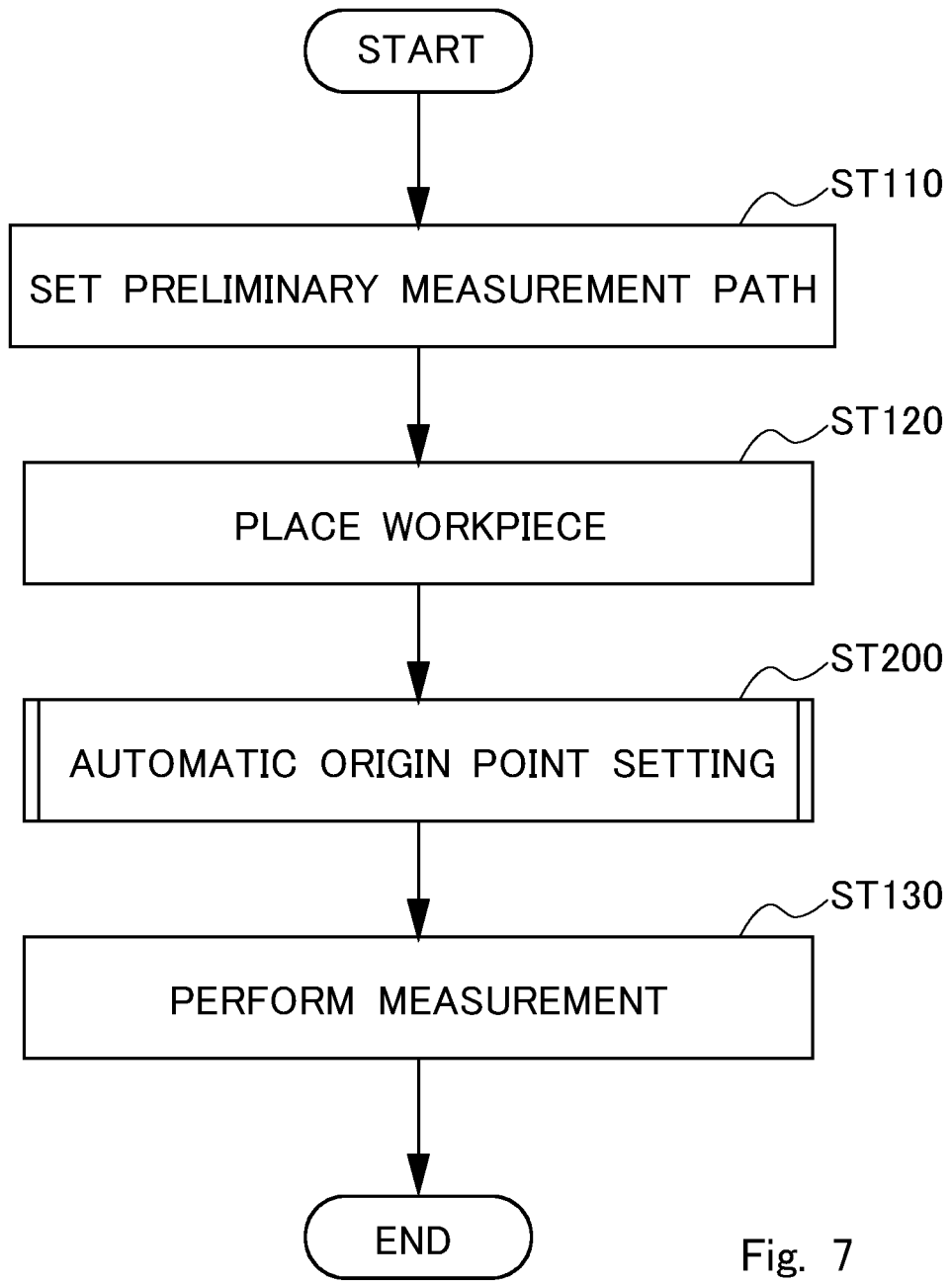
FIG. 7 is a flowchart for explaining an origin point setting method.

FIG. 6 is a functional block diagram of the host computer 400.

The host computer 400 is a computer including a CPU and a memory. The host computer 400 controls the drive of the coordinate measuring machine 200 according to the instructions of a measurement part program 410 as a control program. In the measurement part program 410, how measurement performs, that is, which portions of a workpiece to be scanned in what order, based on, for example, the design CAD data of the object to be measured has been set as a measurement program. At this time, the workpiece is the reference of the position designation, and the measurement program is designated based on a workpiece coordinate system. In addition, a preliminary measurement program 411 for automatically setting the workpiece coordinate system has been set, but this is described later with reference to a flowchart.

The host computer 400 further includes a drive controller 420 and a shape analyzer 430. The drive controller 420 includes a moving mechanism controller 421 and a focusing determiner 422. The moving mechanism controller 421 controls the drive of the moving mechanism of the coordinate measuring machine 200. The focusing determiner 422 performs focusing determination of the CPS 260. The moving mechanism controller 421 instructs the moving mechanism to move according to movement instructions preset in the measurement part program 410.

The moving mechanism controller 421 finely adjusts the moving mechanism (especially, the Z-axis driving mechanism) according to the focusing determination of the focusing determiner 422 so that the distance between the CPS 260 and the surface of the workpiece is the focal distance. The focusing determiner 422 includes a calculation processor (for example, an S-shape signal (focus signal) calculator) necessary for focusing determination, and has a focusing determination threshold. Furthermore, a light quantity threshold for determining whether the light quantity necessary for adjusting the focal point is obtained is set in the focusing determiner 422. The focusing determiner 422 determines that the state in which the measurement light does not reach the light quantity threshold as a "detection error".

The shape analyzer 430 processes the measurement data acquired by the coordinate measuring machine 200 to perform shape analysis of the workpiece W and the like.

(Motion Explanation)

With reference to the flowcharts in FIGS. 7, 12, 13, and 15, an origin point setting method is described. By executing the preliminary measurement program 411, automatic origin point setting is performed. The preliminary measurement program 411 executes the steps of the flowchart in FIGS. 12, 13, and 15. Before the execution, the operator needs to set a preliminary measurement path in the measurement part program 410 (ST110 in FIG. 7).

Figure 8:
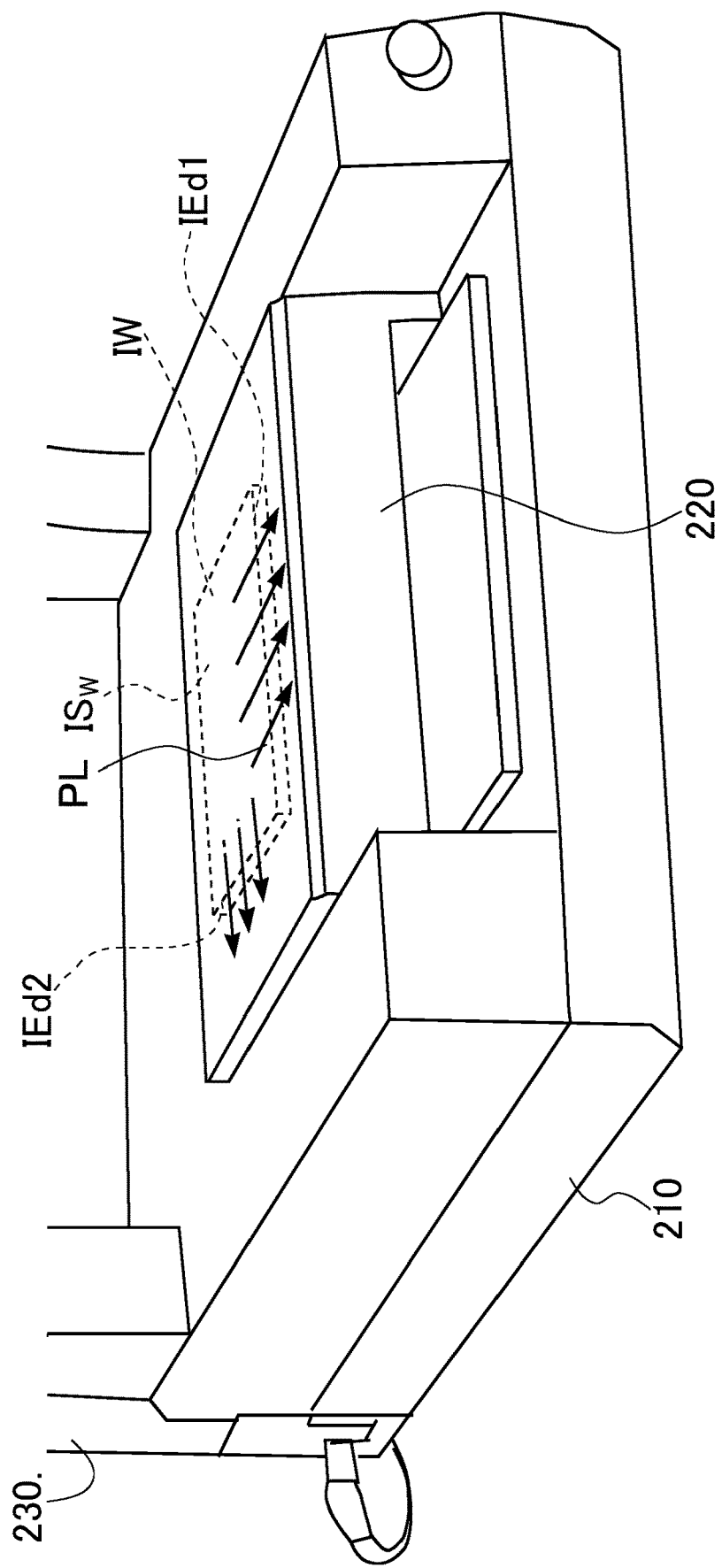
FIG. 8 is a diagram for explaining setting of a preliminary measurement path.

For example, it is assumed that the workpiece W has a flat plate shape as shown by the dashed line in FIG. 8. When the workpiece W is assumed to be placed on the substantially center of the moving table 220, the position of a surface to be measured Sw on the moving table 220 is roughly determined based on the design CAD data of the workpiece W. The workpiece W virtually placed on the moving table 220 is referred to as a "virtual object to be measured IW", the surface to be measured Sw of the "virtual object to be measured" is referred to as a "virtual surface to be measured ISw". An edge of the virtual surface to be measured is referred to as a "virtual edge IEd".

The operator sets, in the machine coordinate system, a plurality of preliminary measurement paths PL so as to cross over the virtual edge IEd of the virtual object to be measured IW. Here, it is assumed that the operator sets four preliminary measurement paths PL in the direction crossing over a front-side first virtual edge IEd1, and further sets three preliminary measurement paths PL in the direction crossing over a second the virtual edge IEd2 intersecting with the first virtual edge IEd1.

Figure 9:
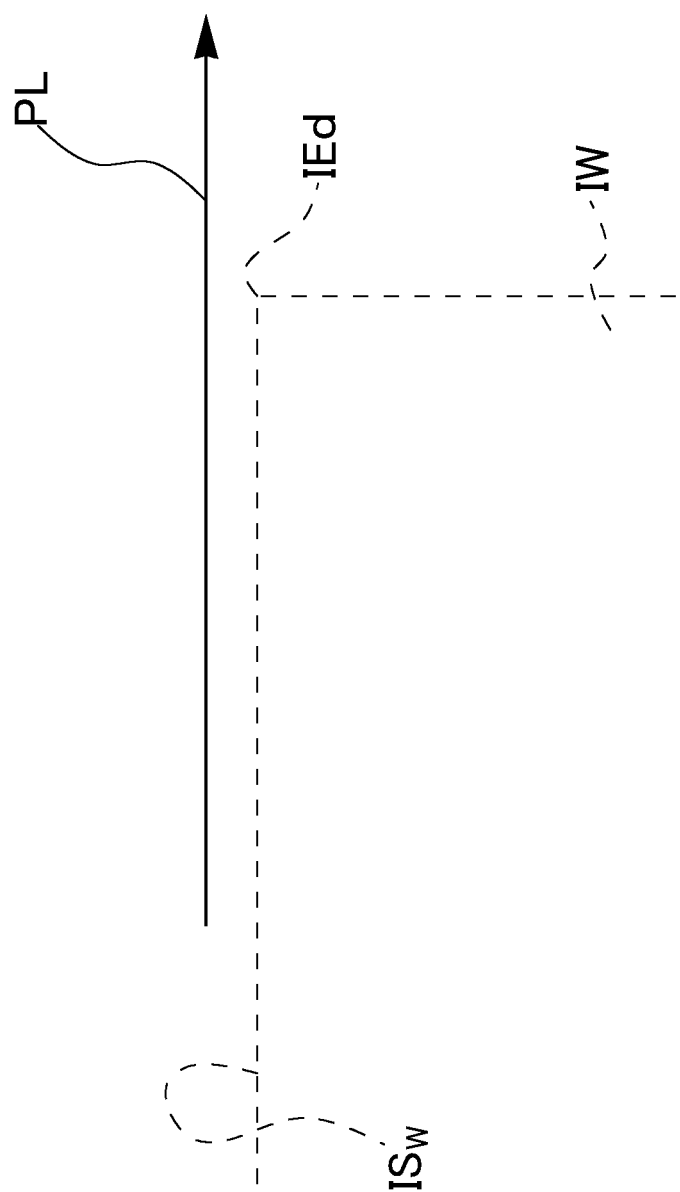
FIG. 9 is a diagram for explaining the setting of the preliminary measurement path.
Figure 10:
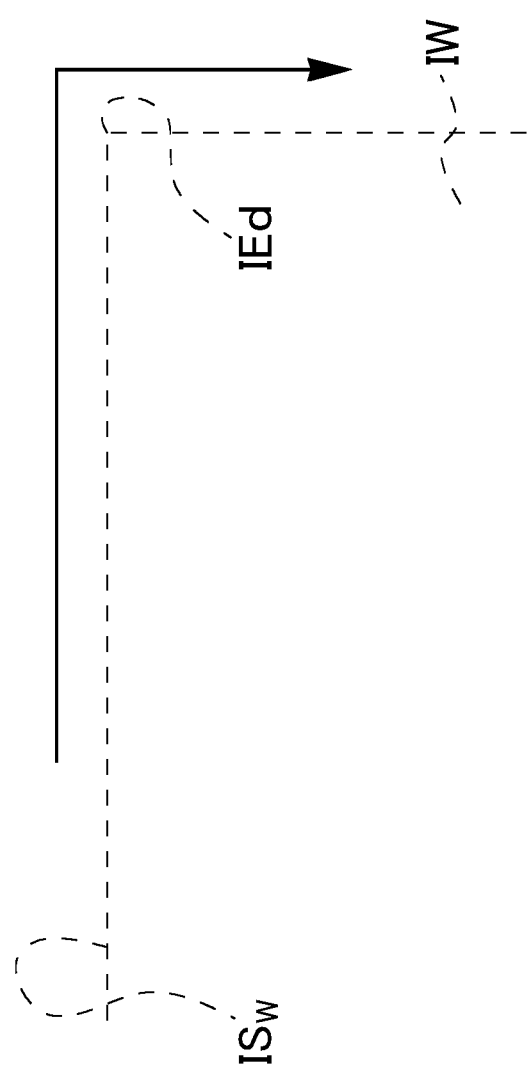
FIG. 10 is a diagram for explaining the setting of the preliminary measurement path.

To set a preliminary measurement path PL, a path extending from a point on the virtual surface to be measured ISw toward the virtual edge IEd is set. Then, the preliminary measurement path PL is set so as to further extend straightly after crossing over the virtual edge IEd of the virtual surface to be measured ISw as shown in FIG. 9. In other words, it is unnecessary to set a path so as to turn at the virtual edge along the shape of the object to be measured as shown in FIG. 10.

Figure 11:
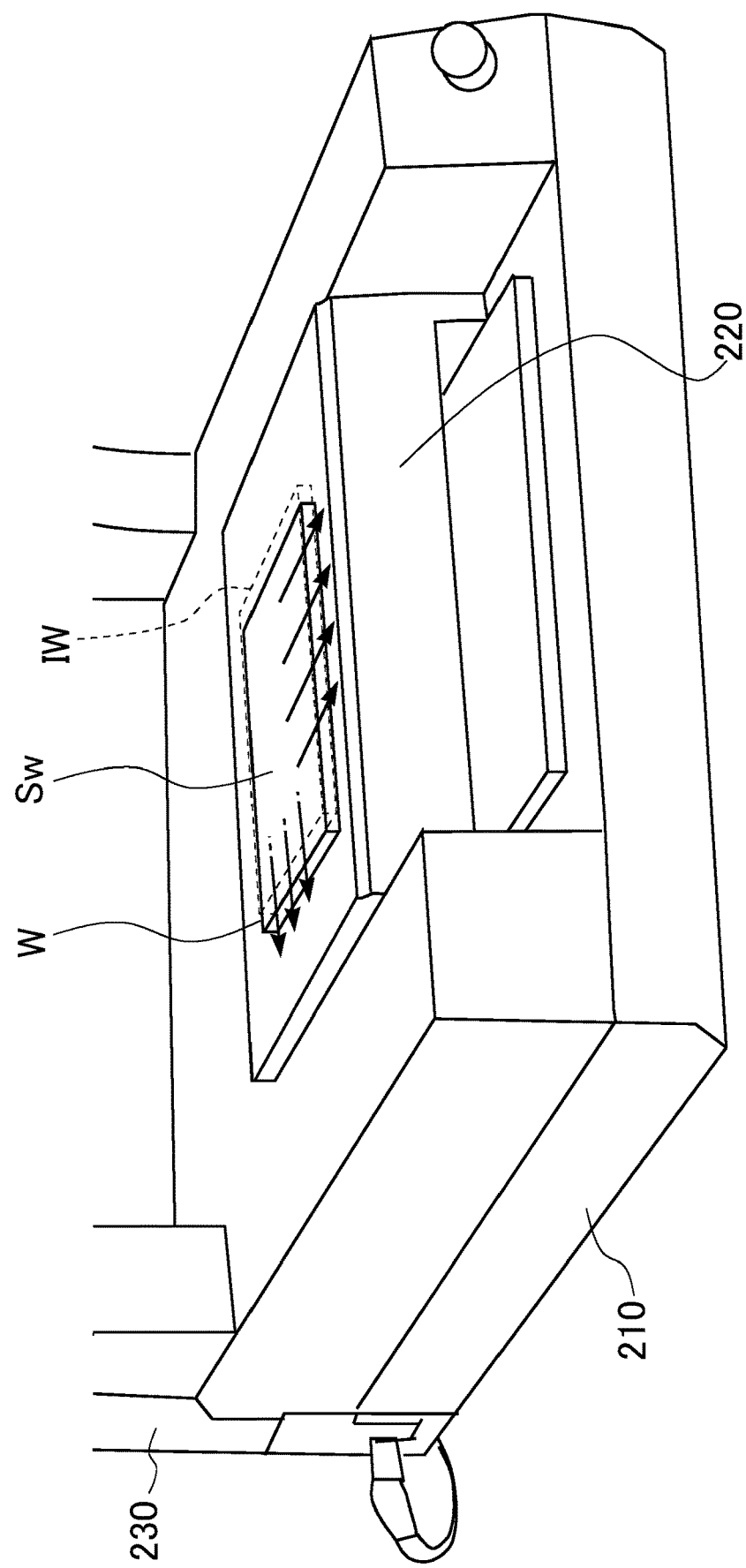
FIG. 11 is a diagram showing that an object to be measured is placed on a moving table.

After a preliminary measurement path has been set (ST110), the workpiece W is actually placed on the moving table 220 as shown in FIG. 11 (ST120). At this time, although it is natural that the actual workpiece W is slightly shifted from the position of the "virtual object to be measured IW" and slightly rotated, this does not matter as long as the preliminary measurement path PL crosses over the edge Ed of the workpiece W. The operator selects an automatic-origin-point setting mode in this state, and the surface texture measuring apparatus 100 executes the preliminary measurement program 411 to perform the automatic origin point setting (ST200).

Figure 12:
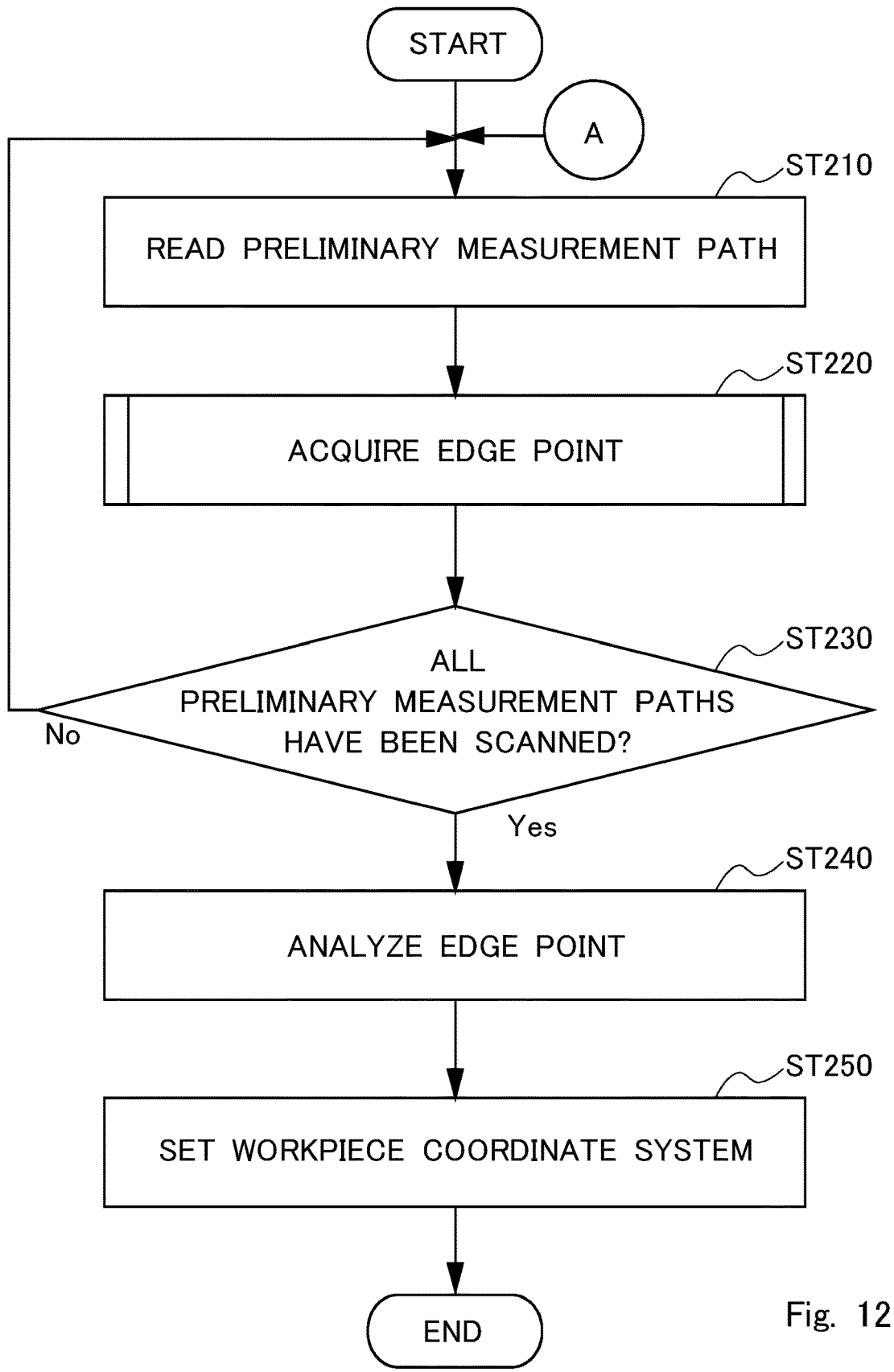
FIG. 12 is a flowchart for explaining the origin point setting method.
Figure 13:
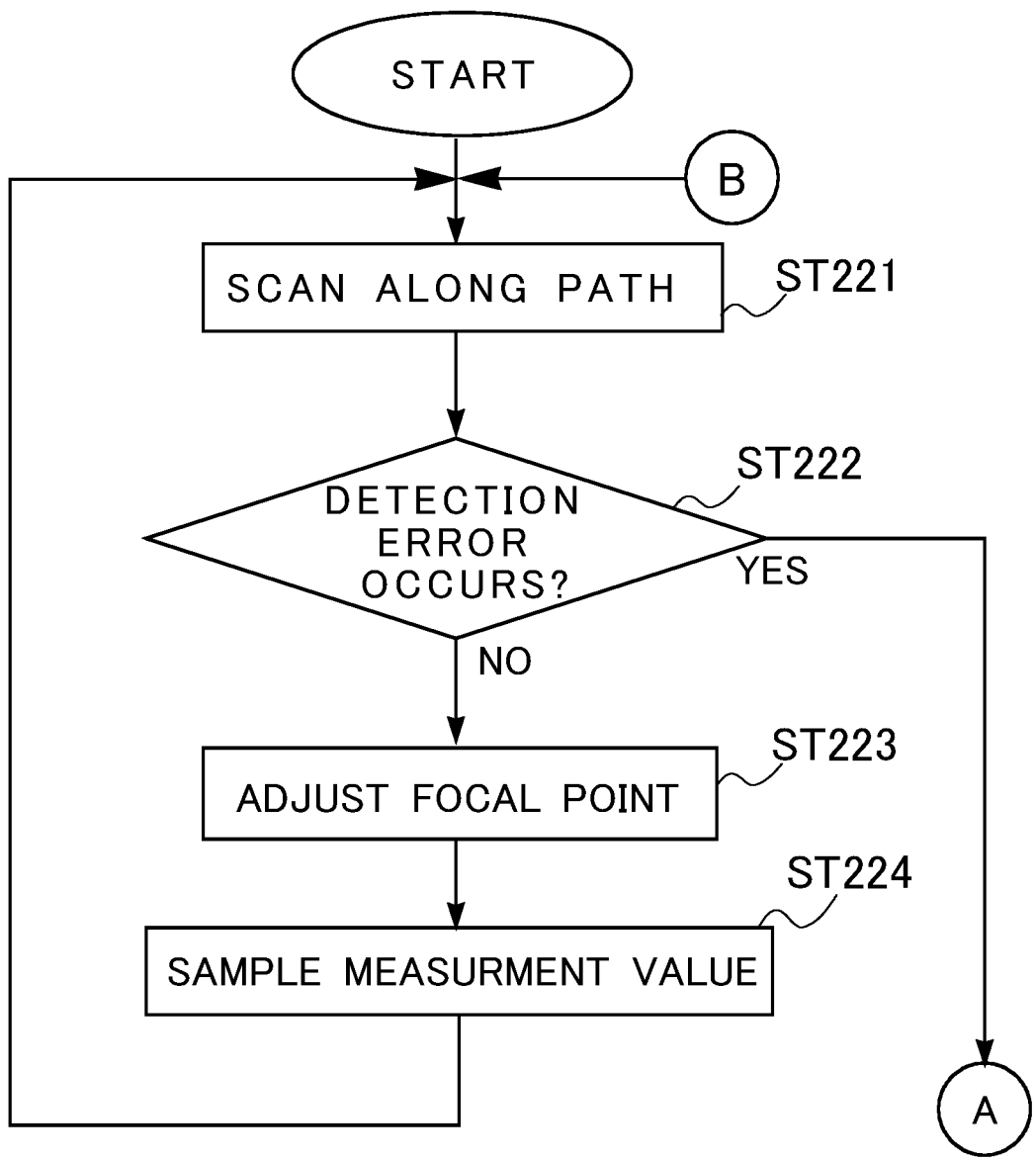
FIG. 13 is a flowchart for explaining the origin point setting method.
Figure 15:
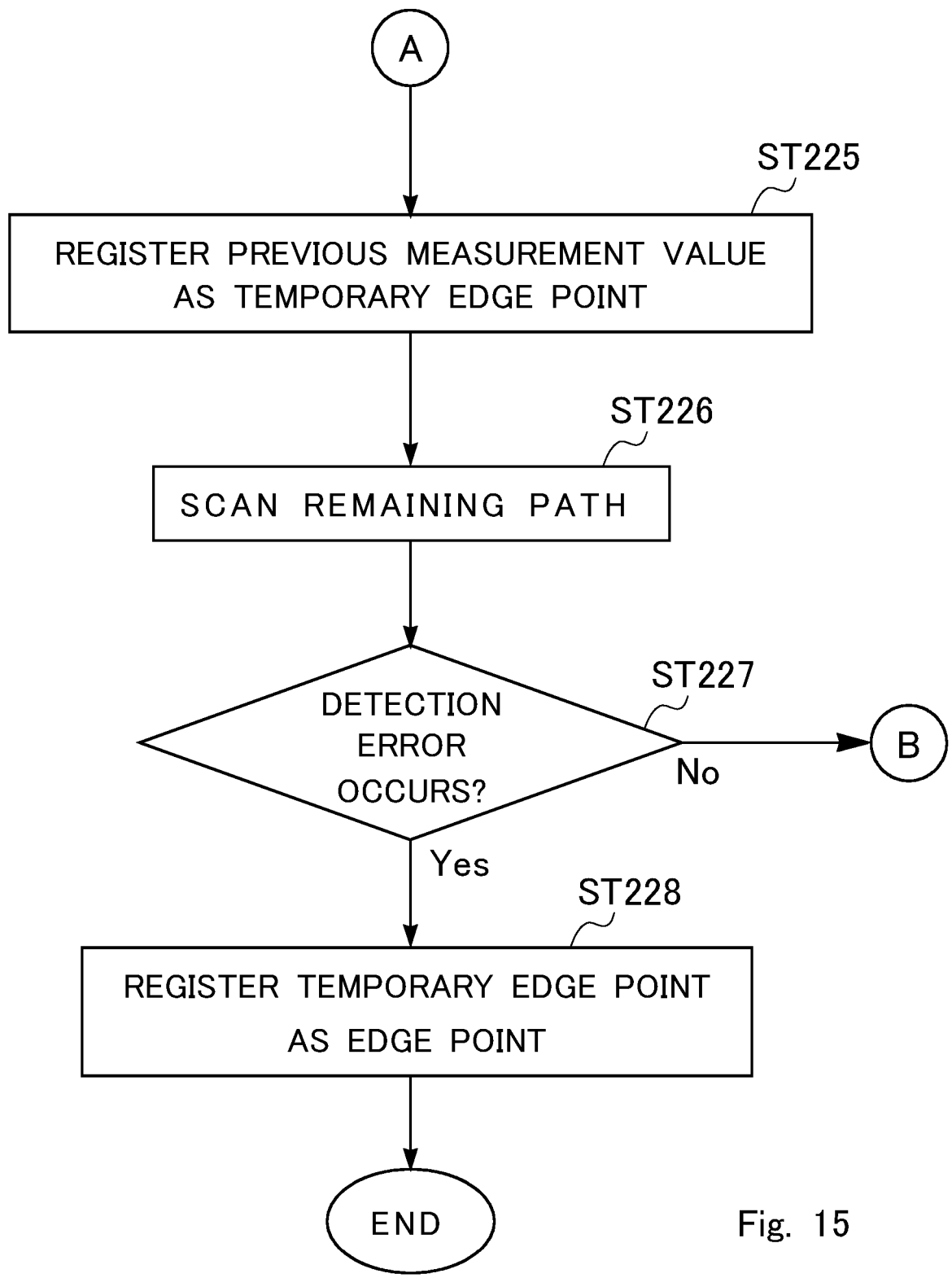
FIG. 15 is a flowchart for explaining the origin point setting method.

With reference to the flowcharts in FIGS. 12, 13, and 15, the motion of the automatic origin point setting is described. First, a preliminary measurement path PL is read in ST210. There is a plurality of set preliminary measurement paths PL. Here, it is assumed that the preliminary measurement paths are sequentially read one by one.

Next, the coordinates of an edge point on the preliminary measurement path PL is acquired (ST220). The motion for acquiring the coordinates of the edge point is described with reference to the flowcharts in FIGS. 13 and 15.

Figure 14:
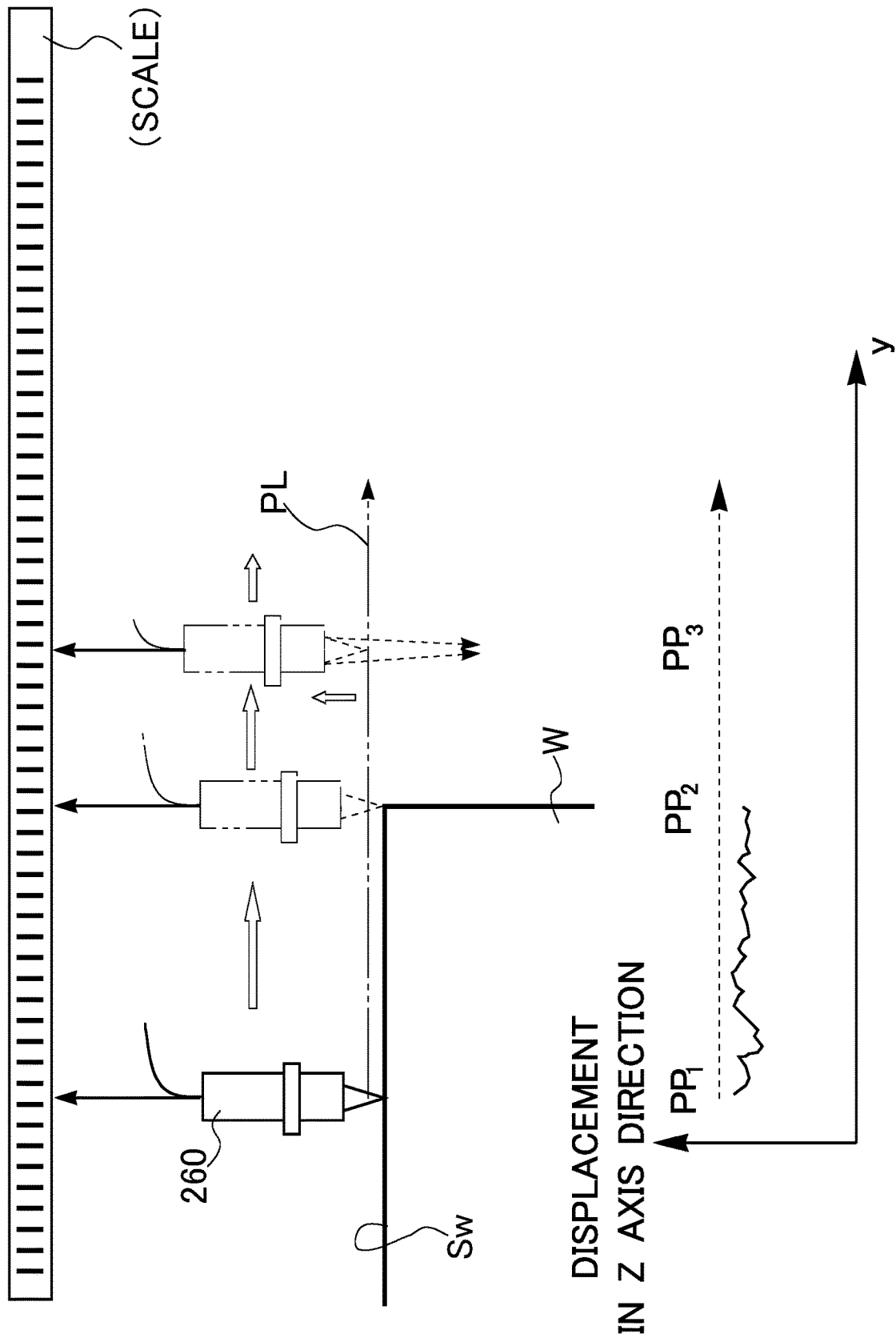
FIG. 14 is a schematic diagram for explaining the motion of preliminary measurement.

The surface texture measuring apparatus 100 moves the CPS 260 to the start point of the preliminary measurement path PL, and starts the scanning from the start point along the preliminary measurement path PL. When the quantity of light is sufficient and no detection error occurs (ST222: NO), the motion is the same as that of ordinary measurement. The height of the CPS 260 is adjusted so as to adjust the focal point based on a focus signal (ST223), and a measurement value (xm, ym, zm) is sampled at the height where the focal point is adjusted (ST224). For example, the motion for measuring the surface to be measured Sw of the workpiece from a point PP1 to a point PP2 in FIG. 14 is equivalent to ordinary scanning measurement.

However, at the moment when the CPS 260 passes the point PP2 which is the edge position, reflected light does not return to the CPS 260. Then, due to insufficient of the quantity of light, a detection error occurs (ST222: YES). When a detection error has occurred (ST222: YES), the processing proceeds to the flowchart in FIG. 15, and the previous sampling value (xm, ym, zm) is registered as a temporary edge point (ST225).

The scanning is subsequently performed to the remaining preliminary measurement path PL while the detection error continuously occurs (ST226). Here, a method for performing "scanning" along the preliminary measurement path PL while the detection error continuously occurs is exemplified. For example, when a detection error occurs due to insufficiency of the quantity of light, the height position of the CPS 260 is adjusted so as to virtually adjust the focal point on the set preliminary measurement path (see FIG. 14). In this state, scanning per sampling pitch is performed along the preliminary measurement path. (Naturally, since the focal point is not adjusted, "measurement values" are not acquired, and detection error signals are simply output.)

When the detection error continuously occurs in scanning the remaining preliminary measurement path PL (ST227: YES), and when a measurement value cannot be sampled in the remaining path because the focal point is not adjusted, this means that the CPS 260 has passed the edge after the point PP2. Thus, the temporary edge point temporarily registered in ST225 is the coordinates of the edge on the preliminary measurement path PL. The coordinates registered as the temporary edge point is set as an edge point (ST228).

In this manner, the edge point on the preliminary measurement path PL has been acquired, steps from ST221 to ST228 are performed to all the set preliminary measurement paths PL (ST230 in FIG. 12), and the respective edge points of all the preliminary measurement paths PL are acquired (ST220 in FIG. 12). When all the edge points are acquired, shape analysis is performed by the shape analyzer 430 (ST240). Accordingly, the Xw axis, the Yw axis, and the Zw axis are determined, and the intersection point of the coordinate axes is set as the origin point of a workpiece coordinate system to set the workpiece coordinate system (ST250).

As described above, according to the present exemplary embodiment, it is possible to automatically set a workpiece coordinate system and the origin point of the workpiece coordinate system in the case of using a sensor probe having an extremely-short tracking range.

(Supplementary Explanation)

When a detection error occurs (ST222 in FIG. 13: YES), it can be assumed at that time that "the edge point has been acquired". However, in the present exemplary embodiment, the remaining preliminary measurement path is scanned in steps from ST225 to ST228 in FIG. 15 although the detection error continuously occurs. Then, when the detection error due to insufficiency of the quantity of light continues in the remaining path (ST227: YES), the temporarily-registered temporary edge point is registered as the edge point (ST228).

Figure 16:
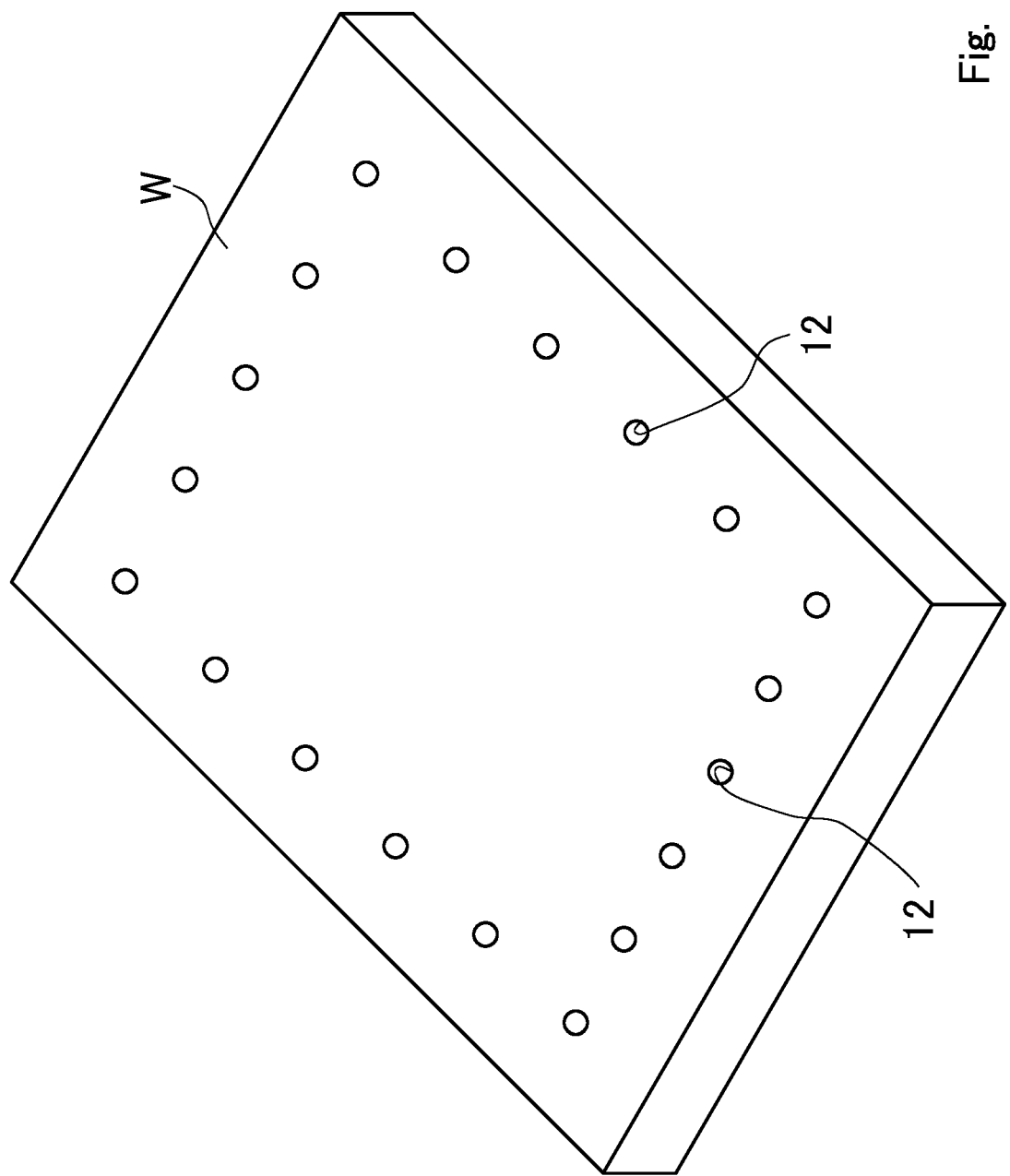
FIG. 16 is a diagram showing an object to be measured having a hole.

This is because that a rim of, for example, a hole is not mistaken for the edge of the workpiece. For example, the workpiece W can have a hole 12 near the outer edge as shown in FIG. 16. The preliminary measurement path PL can be set so as to avoid the hole 12, but when the workpiece W is placed on the moving table 220 (FIG. 11), the actual workpiece is slightly shifted from the position of the "virtual object to be measured" and slightly rotated, and the preliminary measurement path cannot avoid passing the hole 12. For this reason, after a detection error occurs (ST222: YES), the scanning is performed to the end of the preliminary measurement path PL while the detection error continuously occurs, and the previous sampling value immediately before the detection error is acquired as the edge point.

Modified Example 1

Figure 17:
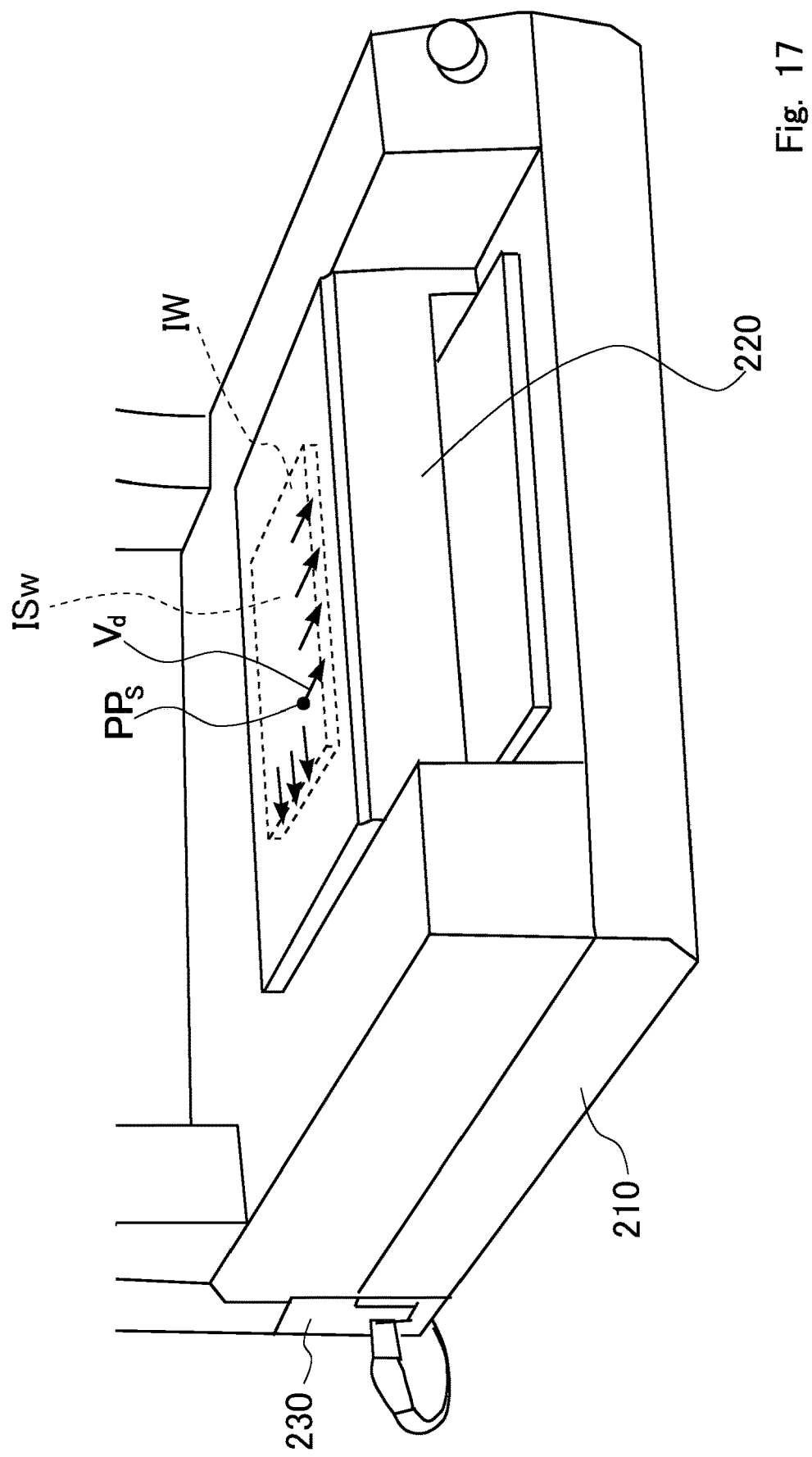
FIG. 17 is a diagram for explaining a modified example.

In the first exemplary embodiment, the preliminary measurement path PL is set as a line connecting the start point and the end point. As a modified example 1, the preliminary measurement path PL may be set with the coordinates of a start point PPs and a direction vector Vd (FIG. 17). In this case, it is preferable that a length threshold Lt for edge detection has been set. In other words, after a detection error occurs (ST222 in FIG. 13: YES), when the detection error continuously occurs after the scanning for the distance of the length threshold Lt, the temporarily registered temporary edge point is actually registered as the edge point.

Figure 18:
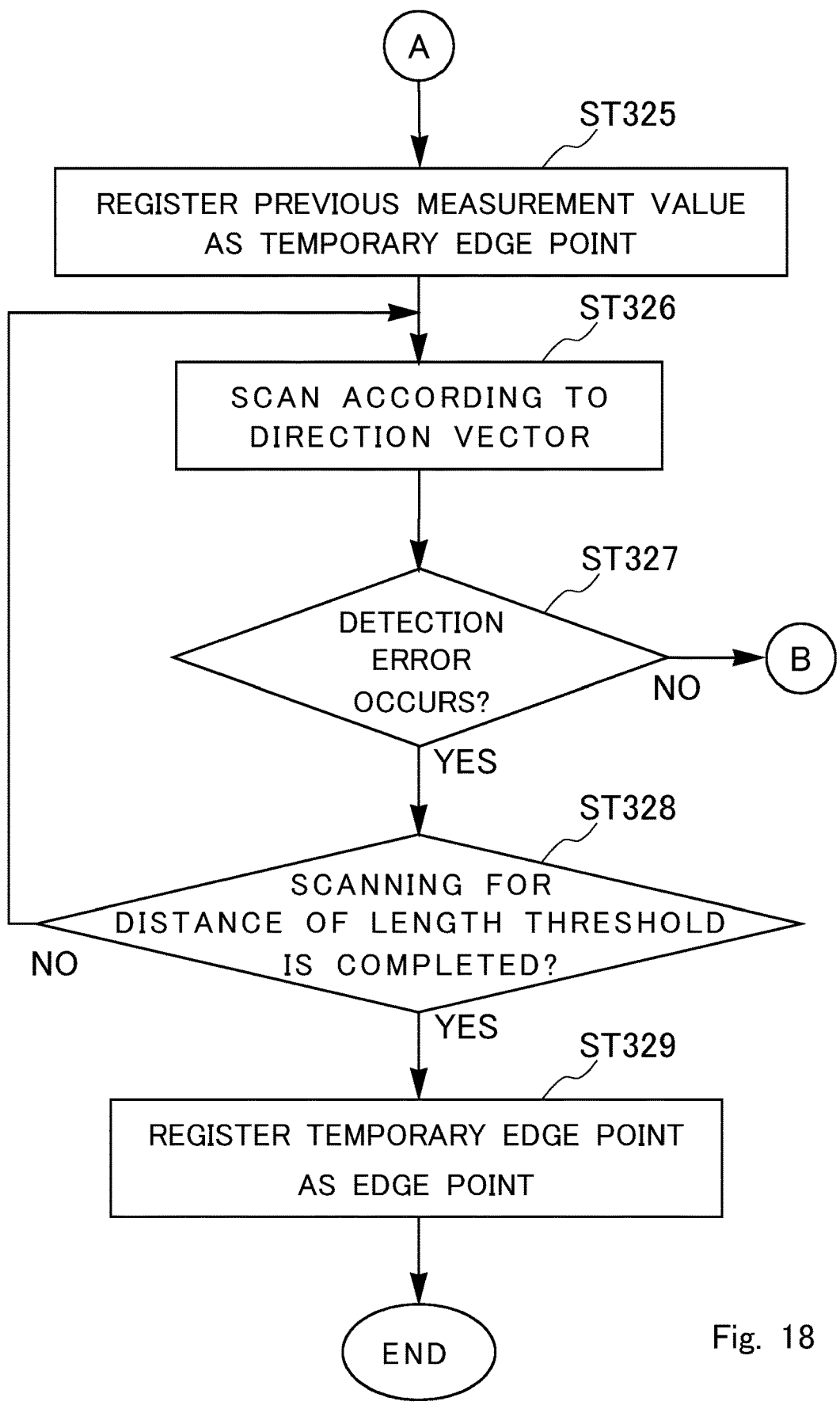
FIG. 18 is a flowchart for explaining the modified example.

The flowchart in FIG. 18 is referred to.

When the CPS 260 passes the edge or the rim of a hole, a detection error occurs due to insufficiency of the quantity of light (ST222 in FIG. 13), and the sampling value immediately before the detection error is registered as the temporary edge point using the detection error as a trigger (ST325 in FIG. 18). The CPS 260 is subsequently moved by a sampling pitch according to the direction vector Vd of the preliminary measurement path PL while the detection error continuously occurs (ST326). When the detection error continues after the CPS 260 is moved by the distance of the predetermined length threshold Lt according to the direction vector Vd (ST327: YES), the coordinates registered as the temporary edge point is set as the edge point (ST319).

On the other hand, when the detection error does not continue (ST327: NO), and when the focal point is adjusted with a focus signal, this means that the error does not indicate the edge (for example, the error indicates a hole), the processing returns to the first step (ST221 in FIG. 13) to repeat the steps.

Note that, the present invention is not limited to the above exemplary embodiment, and can be changed without departing from the scope.

A CPS is exemplified as a point sensor, but a contact stylus may be used for example. As long as a sensor, such as a probe, has only one measurement axis and an extremely-short tracking range (for example, about ±3 mm or about ±0.3 mm), such a sensor has the common problem of the present invention, and can solve the problem with the present invention. It is needless to say that the present invention is widely applicable not only to a probe sensor but to the case in which an edge detection cannot be properly performed.

In the above description, it is exemplified that the edge point is set at the point where the state in which a measurement value is acquirable is changed to the state in which a detection error occurs (ST222 in FIG. 13: YES) and a measurement value is not acquirable (ST225 in FIG. 15 or ST352 in FIG. 18).

Conversely, it is possible to recognize, as the edge point, the point where the state in which a detection error occurs and a measurement value is not acquirable is changed to the state in which measurement data is acquirable. In this case, the preliminary measurement path PL has been set so as to extent from outside a workpiece toward the workpiece. Then, when a probe (for example, the CPS 260) scans outside the workpiece along the preliminary measurement path PL, a detection error occurs, but when the probe reaches the edge of the workpiece, the measurement value is acquired. Accordingly, it is possible to set, as the edge point, the point where the status in which a measurement point is not acquirable due to the detection error is changed to the state in which measurement data is acquirable.

The invention claimed is:

1. A method for controlling a surface texture measuring apparatus that scans a surface of an object to be measured with a contact or contactless probe and measures a shape of the surface of the object to be measured, the method comprising:
    scanning the surface of the object to be measured along a preset preliminary measurement path with the probe;
    temporarily registering, by using a detection error of the probe, which occurs when a measurement range of the probe is exceeded, as a trigger, a measurement value immediately before the detection error has occurred as a temporary edge point; and
    setting, upon continuously occurring the detection error during the subsequent scanning along the preliminary measurement path for a predetermined distance, the temporarily-registered temporary edge point as an edge point.

2. The method for controlling the surface texture measuring apparatus according to claim 1, wherein the preliminary measurement path is set so as to extend, in a machine coordinate system, from a virtual surface to be measured of a virtually-set virtual object to be measured and to further extend straightly after crossing over a virtual edge.

3. The method for controlling the surface texture measuring apparatus according to claim 1, wherein the probe is a chromatic point sensor.

4. The method for controlling the surface texture measuring apparatus according to claim 1, wherein the probe outputs the detection error at the moment when the probe crosses over an edge of the object to be measured.

5. A method for controlling a surface texture measuring apparatus that scans a surface of an object to be measured with a contact or contactless probe and measures a shape of the surface of the object to be measured, the method comprising:
    presetting a preliminary measurement path so as to extend from outside the object to be measured toward the object to be measured;
    outputting a detection error, which occurs when a measurement range of the probe is exceeded, while the probe scans along the preliminary measurement path outside the object to be measured;
    acquiring a measurement value when the probe reaches an edge of the object to be measured; and
    setting, as an edge point, a point where a state in which a measurement value is not acquirable due to the detection error is changed to a state in which the measurement value is acquirable.

* * * * *